(12) United States Patent
Shinada et al.

(10) Patent No.: US 7,548,172 B2
(45) Date of Patent: Jun. 16, 2009

(54) COMMUNICATION SYSTEM FOR VEHICLE, VEHICLE, AND COMMUNICATION DEVICE FOR VEHICLE

(75) Inventors: Akira Shinada, Tokyo (JP); Kenji Matsumura, Tokyo (JP)

(73) Assignee: Sony Corporation, Tokyo (JP)

( * ) Notice: Subject to any disclaimer, the term of this patent is extended or adjusted under 35 U.S.C. 154(b) by 30 days.

(21) Appl. No.: 10/515,335

(22) PCT Filed: Jun. 3, 2003

(86) PCT No.: PCT/JP03/07021

§ 371 (c)(1),
(2), (4) Date: Dec. 27, 2005

(87) PCT Pub. No.: WO03/105107

PCT Pub. Date: Dec. 18, 2003

(65) Prior Publication Data

US 2006/0119489 A1   Jun. 8, 2006

(30) Foreign Application Priority Data

Jun. 5, 2002   (JP) ............................. 2002-164267

(51) Int. Cl.
*G08G 1/16* (2006.01)
*G02B 26/00* (2006.01)

(52) U.S. Cl. ....................... 340/903; 340/902; 340/905; 340/555; 359/237

(58) Field of Classification Search ................... 340/903
See application file for complete search history.

(56) References Cited

U.S. PATENT DOCUMENTS

| | | | | |
|---|---|---|---|---|
| 2,355,607 A | * | 8/1944 | Shepherd | 340/906 |
| 4,706,086 A | * | 11/1987 | Panizza | 340/902 |
| 4,816,827 A | * | 3/1989 | Baloutch et al. | 340/905 |
| 4,878,050 A | * | 10/1989 | Kelley | 340/825.69 |
| 5,633,629 A | * | 5/1997 | Hochstein | 340/907 |
| 5,635,920 A | | 6/1997 | Pogue et al. | |
| 5,784,006 A | * | 7/1998 | Hochstein | 340/905 |
| 6,262,673 B1 | * | 7/2001 | Kalina | 340/901 |
| 6,459,083 B1 | | 10/2002 | Finkele et al. | |
| 6,765,495 B1 | * | 7/2004 | Dunning et al. | 340/903 |
| 6,879,263 B2 | * | 4/2005 | Pederson et al. | 340/815.45 |

FOREIGN PATENT DOCUMENTS

| | | |
|---|---|---|
| EP | 325 888 | 8/1989 |
| EP | 726 554 | 8/1996 |
| EP | 1 026 650 | 8/2000 |
| JP | 4-131000 | 5/1992 |

(Continued)

*Primary Examiner*—Donnie L Crosland
(74) *Attorney, Agent, or Firm*—Oblon, Spivak, McClelland, Maier & Neustadt, P.C.

(57) ABSTRACT

The present invention is directed to vehicle communication equipment capable of transferring information using light without adding new light emitting means, and further, between a stationary apparatus and a vehicle or between vehicles. A light emitted from a signal lamp (11) of a stationarily installed traffic signal (10) or a head lamp (35) or a tail lamp (36) of a vehicle (20) is superimposed with a signal by a modulator (13), the modulated light is received by a light receiving unit (21) of the vehicle (20) side, and the received modulated light is demodulated by a decoder (22) to be displayed on a display panel (24).

17 Claims, 16 Drawing Sheets

FOREIGN PATENT DOCUMENTS

| | | |
|---|---|---|
| JP | 5-225493 | 9/1993 |
| JP | 05-225493 | 9/1993 |
| JP | 5-266399 | 10/1993 |
| JP | 8-198013 | 8/1996 |
| JP | 8-324429 | 12/1996 |
| JP | 9-51309 | 2/1997 |
| JP | 09-51309 | 2/1997 |
| JP | 9-135205 | 5/1997 |
| JP | 10-261195 | 9/1998 |
| JP | 10-322263 | 12/1998 |
| JP | 11-321380 | 11/1999 |
| JP | 2000-67377 | 3/2000 |
| JP | 2000-233686 | 8/2000 |
| JP | 2001-158390 | 6/2001 |
| JP | 72079/1991 | 7/2001 |
| JP | 2001-334867 | 12/2001 |
| JP | 2002-505027 | 2/2002 |

\* cited by examiner

COMMUNICATION SYSTEM FOR VEHICLE, VEHICLE, AND COMMUNICATION DEVICE FOR VEHICLE

TECHNICAL FIELD

The present invention relates to a vehicle communication system, a vehicle, and vehicle communication equipment, and, in particular, it relates to a vehicle communication system, a vehicle, and vehicle communication equipment that carry out information transfer by using light.

BACKGROUND ART

For example, in Japanese Patent Application Publication (KOKAI) No. Hei 9-51309 there is proposed an inter-vehicle communication system, comprising: a forward light emitting/receiving unit for emitting or receiving a laser beam signal to and from a forward direction of a vehicle; a backward light emitting/receiving unit for emitting or receiving a laser beam signal to and from a backward direction of the vehicle; and signal relay means for relaying signals between the forward light emitting/receiving unit and the backward light emitting/receiving unit so that a laser beam signal including a signal received by the forward light emitting/receiving unit is transmitted from the backward light emitting/receiving unit, and that a laser beam signal including a signal received by the backward light emitting/receiving unit is transmitted from the forward light emitting/receiving unit, thereby enabling a progressive transmission of signals to be established between vehicles, and thereby even in such cases where, for example, a plurality of vehicles are lined up in queue in the forward direction due to a traffic congestion, where there is a too long inter-vehicle distance in a highway or the like, or where visibility between vehicles is deteriorated due to rains, fog or the like, it is ensured for specific information owned by a specific vehicle to be transferred to other vehicles.

Further, in Japanese Patent Application Publication (KOKAI) No. 2001-158390 there is disclosed inter-vehicle communication equipment having a transceiver capable of exchanging information between vehicles for use in a saddle-mount type vehicle, on which an operator ride on a saddle thereof. The inter-vehicle communication equipment is installed adjacent to lighting means in order easily to secure its installation space, in addition to facilitate adjustment of the position of the communication equipment, and thus to enable to improve reception performance thereof.

According to the inter vehicle communication system proposed by the Japanese Patent Application Publication (KOKAI) No. Hei 9-51309, because it transmits information between vehicles using a laser beam signal, it must have light emitting/receiving units for emitting a laser beam specific thereto provided at the front and the rear ends of the vehicle, thereby increasing the cost. Moreover, because this equipment carries out information transmission using the laser beam, if the laser beam emitted from the aforementioned light emitting/receiving unit impinges on a human body, this part of the body may possibly be damaged, thereby causing a safety problem.

Further, according to the inter-vehicle communication equipment disclosed in the Japanese Patent Application Publication (KOKAI) No. 2001-158390, because a separate transceiver must be installed adjacent to its lighting means, it requires a plurality of lighting means additionally, thereby complicating the equipment. And thus there is a disadvantage that the cost thereof increases.

The present invention is contemplated to solve the above-mentioned problems associated with the conventional art, and an object thereof is to provide a novel vehicle communication system, a vehicle, and vehicle communication equipment which enables vehicle communication using the light without requiring any new dedicated light emitting means.

DISCLOSURE OF THE INVENTION

The present invention is directed to a vehicle communication system, comprising:
a light emitting apparatus installed stationarily;
a modulator for modulating a light emitted from the aforementioned light emitting apparatus by superimposing a predetermined signal thereon;
a light receiving apparatus installed on a vehicle side for receiving the light emitted from the aforementioned light emitting apparatus and superimposed with the predetermined signal;
a decoder for reading out the signal superimposed on the light received by the aforementioned light receiving apparatus; and
notifying means for notifying information based on a signal which is read out by the aforementioned decoder.

Here, the aforementioned light emitting apparatus may be a signal lamp of a traffic signal, a street lighting lamp, a warning lamp at a railroad crossing, an embed type signal lamp embedded in a vehicle lane or a signal lamp of a traffic signal installed along a railroad track. In particular, in a case of the signal lamp of the traffic signal installed along the railroad track, this signal lamp is to be received by a light receiving apparatus onboard a railway car. Further, the aforementioned modulator may be of a type operable to modulate by superimposing a coded pulse on a drive current of the aforementioned light emitting apparatus.

Further, the present invention is directed to a vehicle, comprising:
a light emitting apparatus for emitting a light outwardly;
a modulator for superimposing a predetermined signal on the light emitted from the aforementioned light emitting apparatus;
a light receiving apparatus for receiving a light which is emitted from the aforementioned light emitting apparatus of another vehicle and is superimposed with a signal;
a decoder for reading out the signal superimposed on the light received by the aforementioned light receiving apparatus; and
output means for outputting a signal read out by the aforementioned decoder.

Here, it should be noted that the aforementioned light emitting apparatus may be a head lamp, a tail lamp, a brake lamp, a turn indicator lamp or the like that are installed onboard a vehicle to cast illumination lights or warning lights to external directions. Further, it may be such one capable of transmitting information between the aforementioned plurality of vehicles.

Further, it may be arranged such that the aforementioned decoder is provided with identification means for identifying received signals and that only a signal the ID code of which agreed is read out to be outputted. Still further, it is preferably that the aforementioned decoder has discrimination means for discriminating a type of the received signal so as to be able to carry out a signal processing in dependence on the type thereof. Preferably, the aforementioned discrimination means discriminates the type thereof by a category signal attached to the signal. Further, preferably, key operation means is provided whereby, in response to a single operation of the key operation means, a different signal is superimposed on a respective light shed from a plurality of light emitting apparatuses installed onboard the aforementioned vehicle then the respective light is emitted from the respective light emitting apparatuses.

Still further, the present invention is directed to vehicle communication equipment, comprising:

a light emitting apparatus which is installed stationarily; and a modulator for superimposing a predetermined signal on a light emitted from the light emitting apparatus, wherein communication is carried out by emitting the light modulated by the modulator to an external vehicle.

Here, the aforementioned light emitting apparatus is preferably comprised of LEDs. Further, the aforementioned light emitting apparatus is preferably a signal lamp of a traffic signal or a warning lamp at a railroad crossing.

Still furthermore, the present invention is directed to vehicle communication equipment comprising:

a light receiving apparatus for receiving a light which is superimposed with a predetermined signal;

a decoder for reading out the signal superimposed on the light received by the aforementioned light receiving apparatus; and notifying means for notifying information based on the signal read out by the aforementioned decoder. By way of example, the aforementioned notifying means here is preferably a display apparatus.

A preferred embodiment of the present invention relates to a transmission/reception system comprising: equipment capable of transmitting and receiving signals between a station and a vehicle or between vehicles; a display unit functioning as a user interface; and an operation unit, wherein signals are exchanged using a light emitting unit on a station side and/or of the vehicle. According to this system, a dialog is enabled by transmission of information between a stationary apparatus installed relatively nearby and a vehicle or between vehicles. Further, because the exchange of signal is carried out by modulating a light emitted from the stationary apparatus or the vehicle and by superimposing a signal thereon, advantageously, original functions of the existing light emitting apparatuses of the stationary apparatus or the vehicle are maintained as they are, and thus there is no need newly to provide any additional light emitting apparatus.

BEST MODES FOR CARRYING OUT THE INVENTION (1) Embodiment 1

Communication Equipment for Use Between a Stationary Apparatus and a Vehicle: FIGS. 1 to 8

Figure 1:
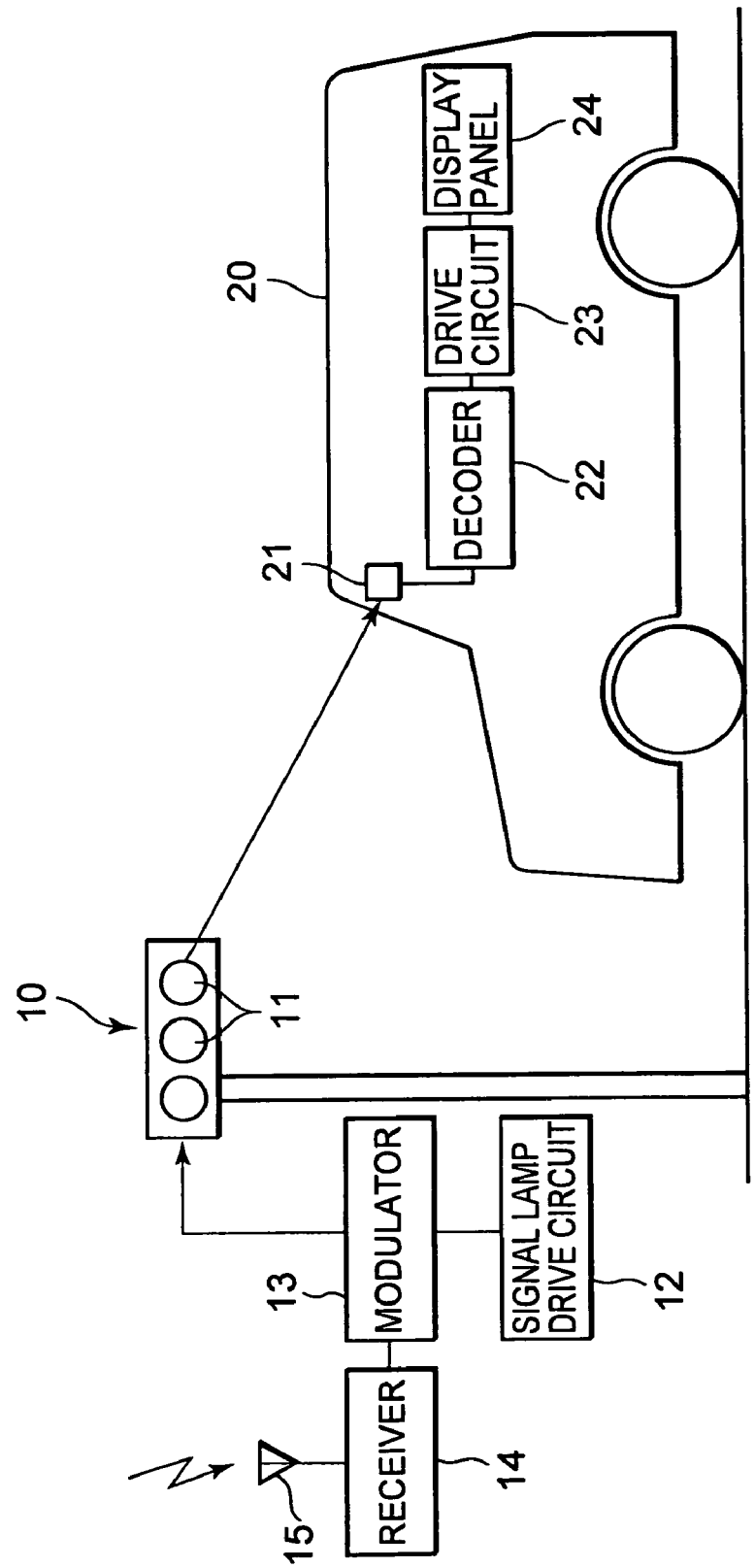
FIG. 1 is a front elevation showing a system configuration of vehicle communication equipment according to a first embodiment.

A typical example of a first embodiment will be described by referring to FIGS. 1 to 4. This equipment is directed to vehicle communication equipment for carrying out information transfer between a traffic signal stationarily installed and a vehicle. As shown in FIG. 1, a traffic signal 10 installed at an intersection of roads or the like has a signal lamp 11 including green, yellow and red colors. A light emitting unit of the signal lamp 11 is comprised, for example, of LEDs (Light Emitting Diodes). This signal lamp 11 is driven by a signal drive circuit 12 which is conventionally known. And a modulator 13 is connected between this drive circuit 12 and the signal lamp 11. The modulator 13 is further connected to a receiver 14. This receiver 14 receives a command signal from outside via an antenna 15.

Conversely, on the side of a vehicle 20, there are provided a light receiving unit 21, a decoder 22, a drive circuit 23, and a display panel 24.

Figure 2:
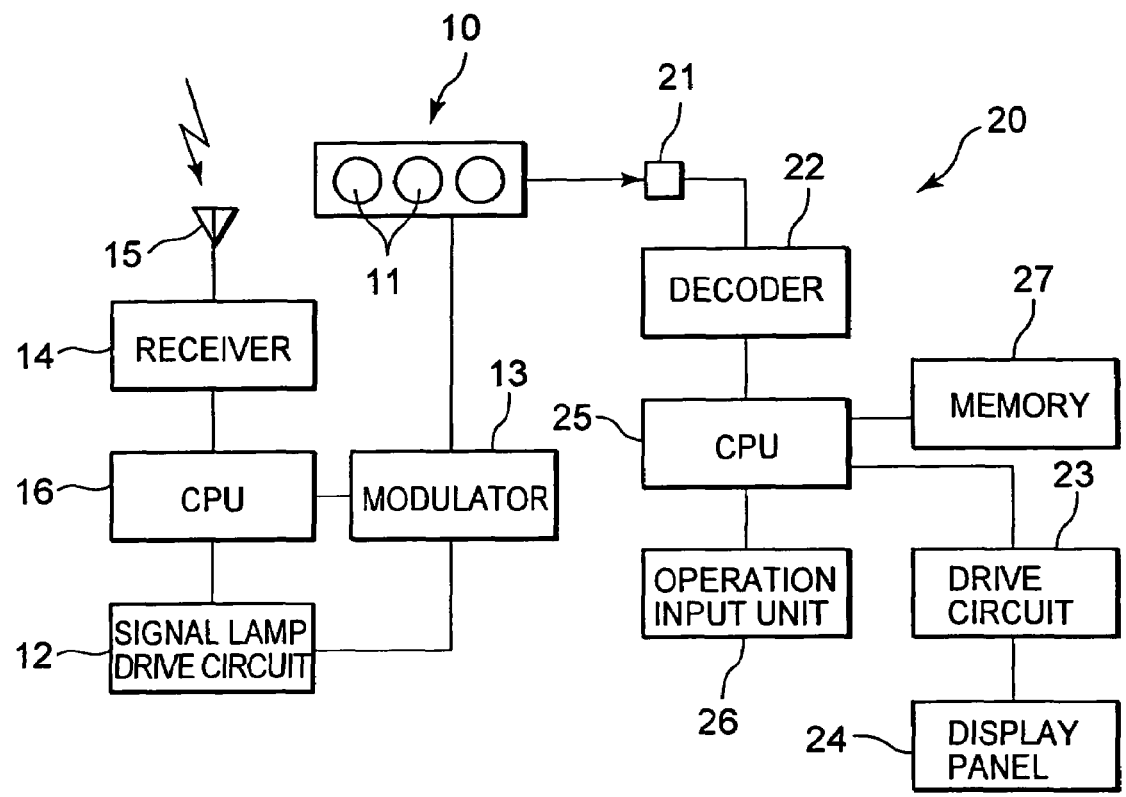
FIG. 2 is a block diagram showing a system configuration of the communication equipment.

FIG. 2 shows a more specific configuration of the aforementioned communication system, in which a portion on the left hand side depicts a system of the traffic signal 10. This system has a CPU 16, and this CPU 16 is interposed between the receiver 14, the signal drive circuit 12 and the modulator 13 for controlling them.

Further, a portion on the right hand side in FIG. 2 depicts a system on the vehicle 20, in which a CPU 25 is connected to the decoder 22. And to the CPU 25 there are connected an operation input unit 26, a memory 27 and the drive circuit 23. The drive circuit 23 drives the display panel 24.

In this arrangement described above, the receiver 14 on the side of the traffic signal 10 receives a command signal by radio from a command unit via the antenna 15. And the receiver 14 transfers this command signal to the modulator 13. The modulator 13 superimposes the aforementioned command signal on a drive current for driving the signal lamp 11 to be generated by the signal drive circuit 12. Thereby, the signal lamp 11 sheds a light for signal display/lighting in a state superimposed with the command signal.

The light which is superimposed with the aforementioned command signal is received by the light receiving unit 21 of the vehicle 20, and the signal is demodulated by the decoder 22. Thereby, this signal thus decoded is supplied to the drive circuit 23 to be displayed on the display panel 24.

Here, information to be superimposed on the light shed from the signal lamp 11 may be any information relating to a traffic regulation, no-right turn or one-way traffic information. Alternatively, the information may be the one indicating the time it takes for the traffic signal to change to green indicating a go-sign or the like. Further, this information may be issued intermittently at a predetermined period of time or when required.

Figure 3:
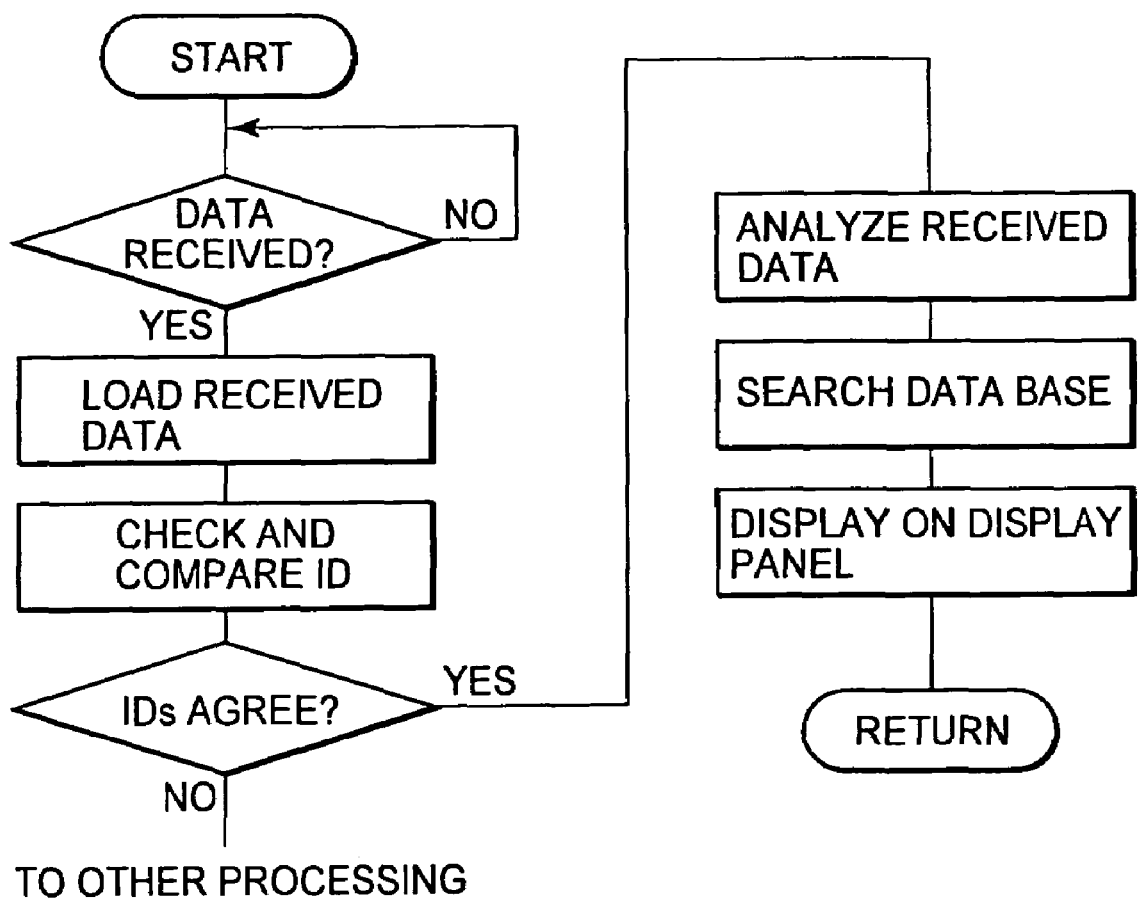
FIG. 3 is a flowchart indicating operation of the communication equipment.

FIG. 3 shows an example of operation of the vehicle communication equipment. Here, the CPU 25 on the side of the vehicle 20 connected to the decoder 22 therein discriminates whether or not a signal is received, and when the signal is received, loads a received data in a D-RAM of the CPU 25. And by carrying out check and compare operation of IDs with the received data, and only in a case where IDs are agreed therebetween, the received data is analyzed, and a search operation through a database stored in the memory 27 is carried out. Then, display contents to be given from the database are displayed on the display panel 24 operated by the drive circuit 23. Here, the ID check operation is carried out in order to omit the display of unnecessary information or to cut the unnecessary information. However, this ID check operation may be omitted if required so.

As a method of modulation for modulating the drive current of the signal lamp 11 with the signal by means of the modulator 13, there may appropriately be adopted various modulation methods such as AM modulation, FM modulation, pulse width modulation, pulse code modulation or the like.

Figure 4:
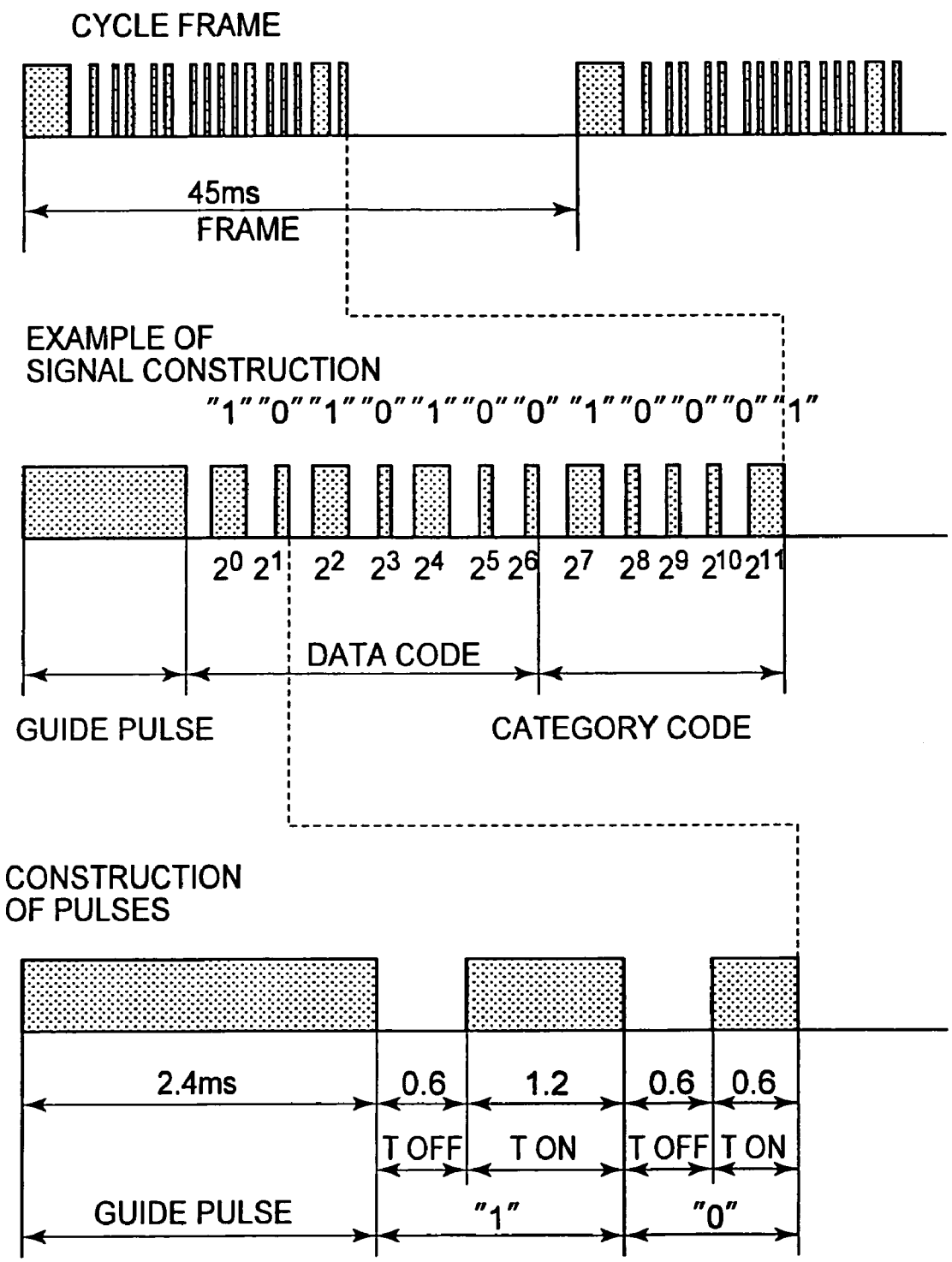
FIG. 4 is a waveform diagram showing a pulse construction of information to be transmitted.

FIG. 4 shows an example of a signal construction based on the pulse code modulation method, in which one frame is formed as a cyclic frame of 45 ms period of time. Here, each frame is comprised of a guide pulse, a data code and a category code. A more specific exemplary construction of these pulses is shown in TABLE 1.

TABLE 1

| Name | Sign | Pulse Width | Deviation |
| --- | --- | --- | --- |
| Guide Pulse | Tg | 2.4 ms | ±0.1 ms |
| Off Time | T OFF | 0.6 ms | ±0.1 ms |
| On Time | T ON "0" | 0.6 ms | ±0.1 ms |
|  | T ON "1" | 1.2 ms | ±0.1 ms |
| Carrier | fo | 40.0 kHz | ±400 Hz |
| Frame Cycle | Tf | 45.0 ms | ±0.1 ms |

As clearly known from the above TABLE 1, the guide pulse has a pulse width of 2.4 ms, in contrast to this, the data code, by sequentially forming a pulse of 0.6 ms pulse width indicating "0" and a pulse of 1.2 ms pulse width indicating "1", transfers a predetermined information. It is to be noted, however, that this method of pulse forming by using the modulator 13 is only one example, and various other methods may be adopted depending on its object and the length of information.

Further, in a case of superimposing a signal on the light emitted from the signal lamp 11 on the basis of the pulse code modulation as described above, it is preferable for the signal lamp 11 to be comprised of LEDs which have excellent responsiveness. As for the types of the traffic signal 10, it is applicable to versatile applications, namely, not only to the traffic signal for vehicles 10, but also to a pedestrian signal installed at a crossing.

Figure 5:
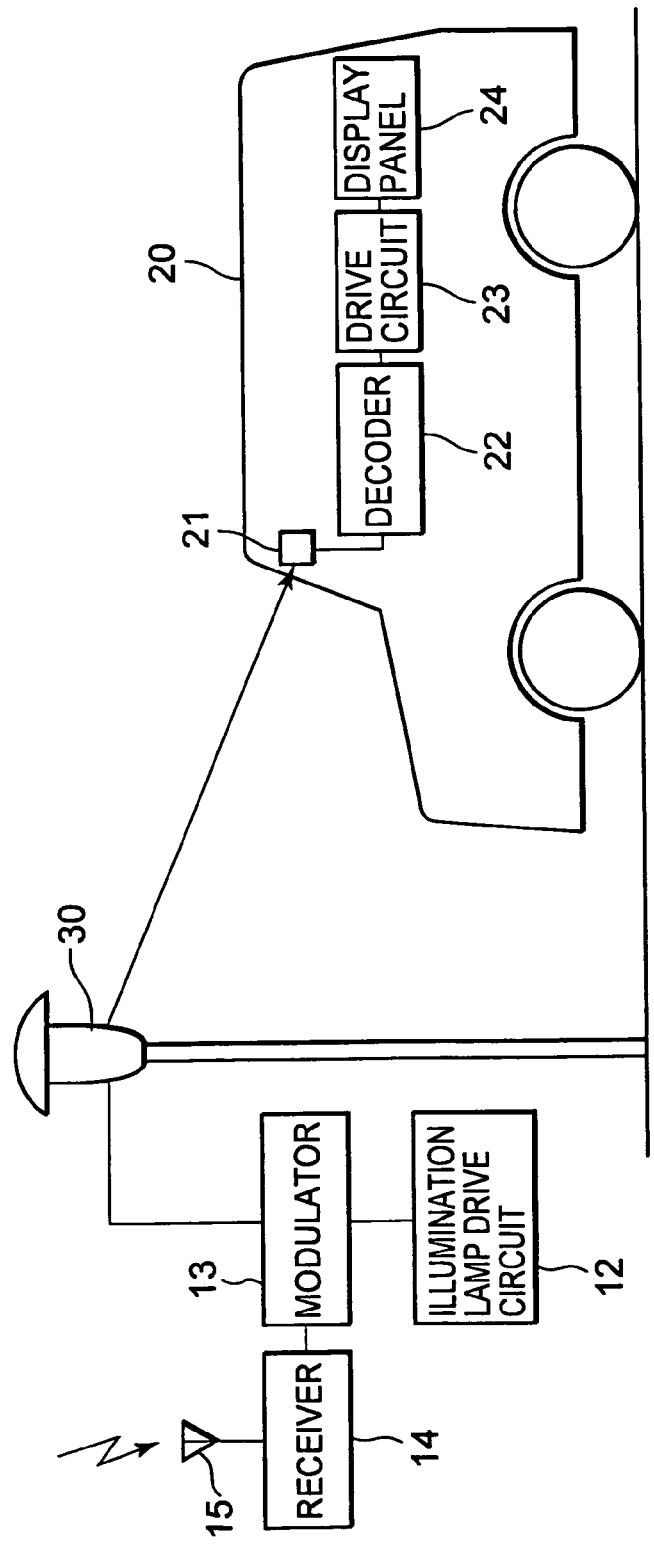
FIG. 5 is a front elevation showing a system according to a modification thereof.

Next, a modification of the aforementioned embodiment of the invention will be described by referring to FIG. 5. This embodiment of the invention is directed to communication equipment for communicating between a street lighting 30 installed along a road and a vehicle 20. In this case of the street lighting 30, also, a modulator 13 is connected to its lamp drive circuit 12, and in addition, this modulator 13 is connected to a receiver 14. And the receiver 14 has an antenna 15, and via which receives a signal from a command station. By way of example, it is preferable for the street lighting 30 to use a LED, a xenon lamp, a discharge lamp, an HID or the like as its light source, whereby responsiveness with respect to the modulation by the modulator 13 will be secured. Conversely, on the side of the vehicle 20, there are provided a light receiving unit 21, a decoder 22, a drive circuit 23 and a display panel 24.

Thereby, it is arranged such that the street lighting 30 illuminates the light which is superimposed with the signal by the modulator 13, the light receiving unit 21 of the vehicle 20 receives this light then to be read out by the decoder 22 and displayed on the display panel 24 via the drive circuit 23. Thereby, a predetermined display is given on the display panel 24. By way of example, the display to be given thereon may include an indication of the location at which the street lighting is installed, contents of traffic regulations such as one-way traffic and the like, or any other related traffic information such as a state of congestion and the like. Further, as the street lighting for emitting the light which is superimposed with the signal, any other types of street lighting in addition to that indicated in FIG. 5 may be applicable as well.

Figure 6:
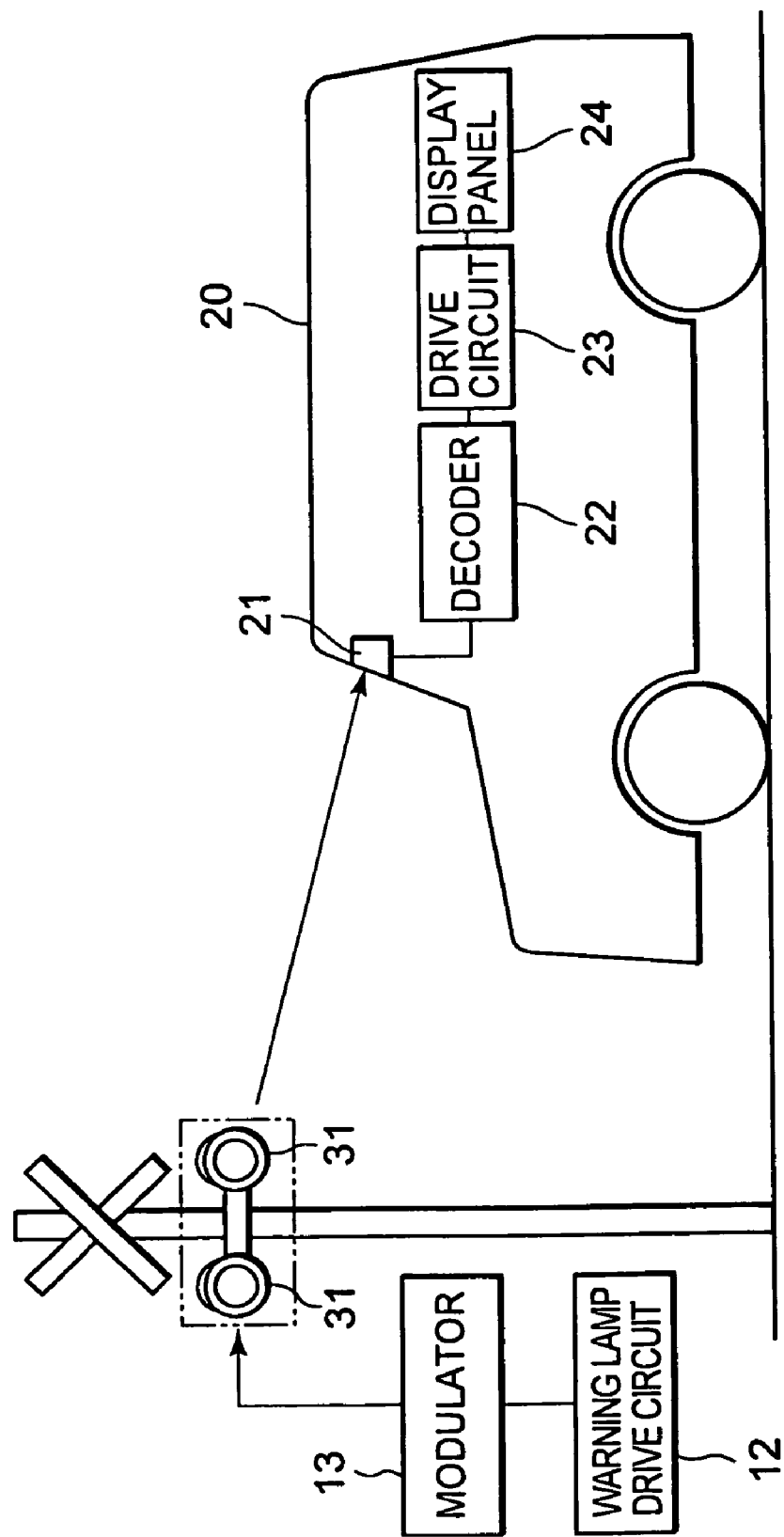
FIG. 6 is a front elevation showing another system according to another modification.

FIG. 6 shows still another embodiment of the invention. This relates to communication equipment for transmitting/receiving information between a warning lamp 31 installed at a railroad crossing and a vehicle 20. That is, the warning lamp 31 in this case is connected to a warning lamp drive circuit 12 and a modulator 13. On the other hand, on the side of the vehicle, there are provided a light receiving unit 21, a decoder 22, a drive circuit 23 and a display panel 24. A light emitting unit of the warning lamp 31 is comprised of, for example, LEDs.

Thereby, it is arranged such that the warning lamp 31 emits a light on which a signal is superimposed by the modulator 13, this light is received by the light receiving unit 21 of the vehicle 20 side, and is demodulated by the decoder 22 then to be displayed on the display panel 24 by the drive circuit 23. Thereby, the signal which is superimposed on the warning lamp 31 is enabled to be displayed on the display panel 24.

Contents of such display by the warning lamp 31 at the railroad crossing may be, for example, the time it takes for this railroad crossing to become crossable or any other related information such as accident or the like.

Figure 7:
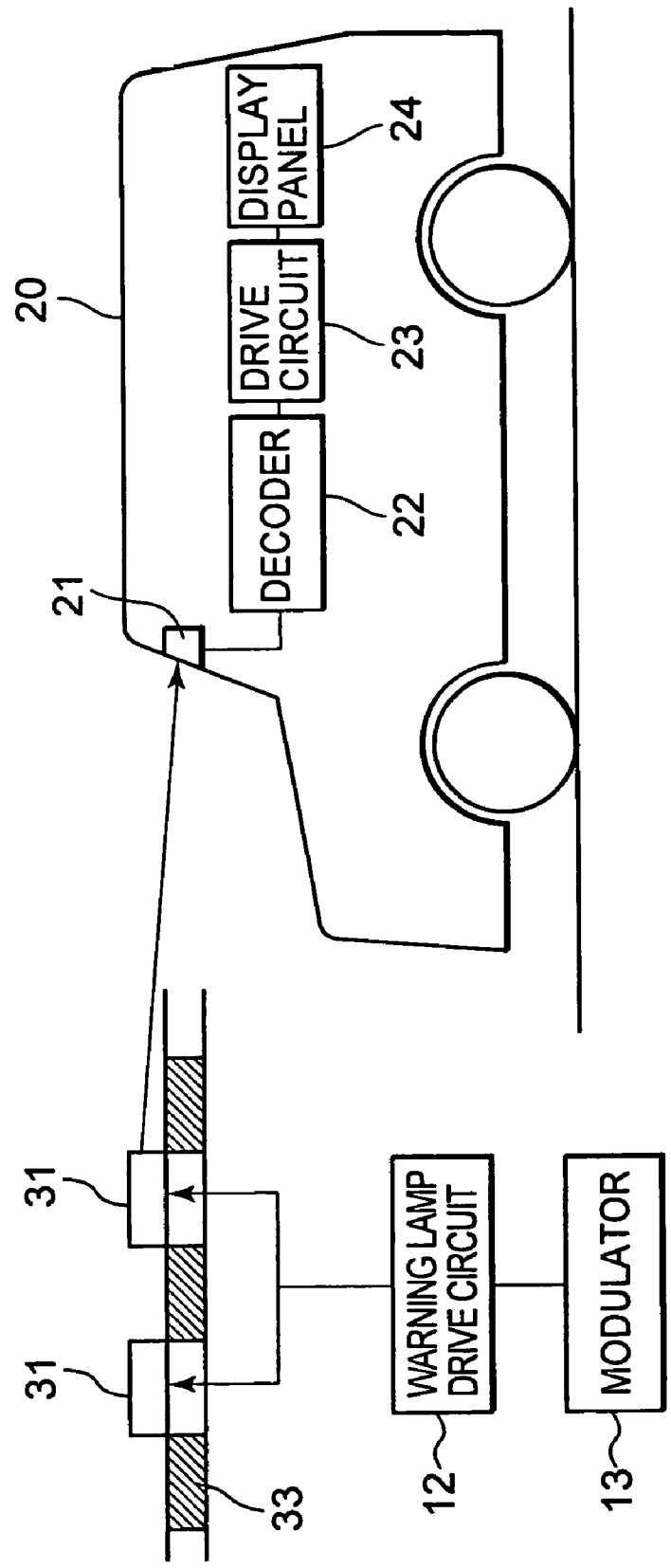
FIG. 7 is a front elevation showing a system configuration according to still another modification.

Further, it is also possible to install the warning lamp 31 in a lifting gate 33 at a railroad crossing as shown in FIG. 7 instead of the warning lamp 31 at the railroad crossing as shown in FIG. 6 and to output a light which is superimposed with a signal via this warning lamp 31. Also, in this case, when the light emitted from the warning lamp 31 is received by a light receiving unit 21 on the vehicle 20, contents of the signal are read out by the decoder 22 to be displayed on the display panel 24 by the drive circuit 23.

Figure 8:
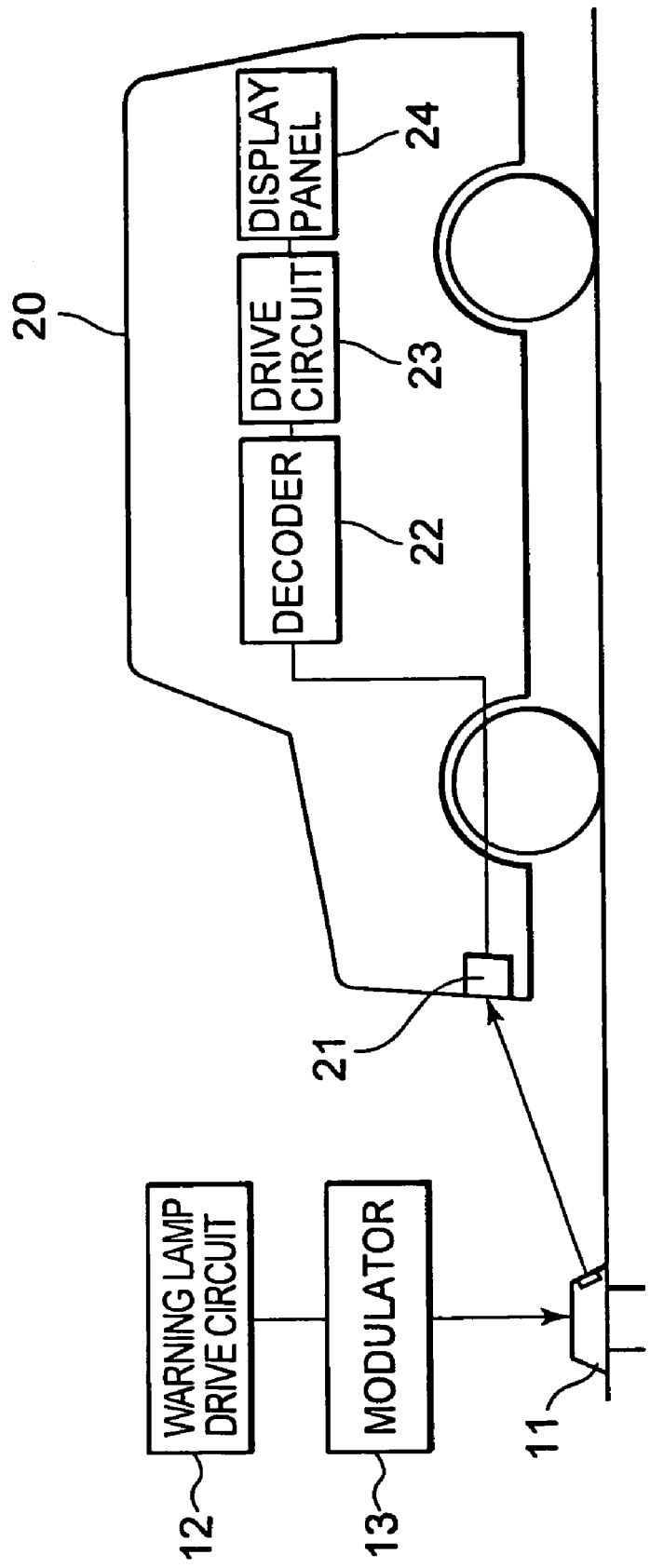
FIG. 8 is a front elevation showing a system configuration according to still more another modification.

Still another modification shown in FIG. 8 may be a signal lamp 11 embedded in a portion of the traffic lane at an intersection or the like, in which a modulator 13 is connected between a drive circuit 12 for driving the signal lamp 11 and the signal lamp 11. Conversely, on the side of a vehicle 20, there are connected a light receiving unit 21, a decoder 22, a drive circuit 23 and a display panel 24. A light emitting unit of the signal lamp 11 is comprised, for example, of LEDs.

Therefore, when the vehicle 20 approaches an intersection, the light receiving unit 21 installed on the front end of the vehicle receives the light superimposed with the signal from the signal lamp 11. Then, contents of the signal in the received light are read out by the decoder 22 to be displayed on the display panel 24 by the drive circuit 23. Thereby, it is enabled to convey information whether or not the direction of the lane the vehicle is passing is a priority road, and as to the presence of traffic regulations inhibiting a left-turn or right-turn and the like.

Figure 9:
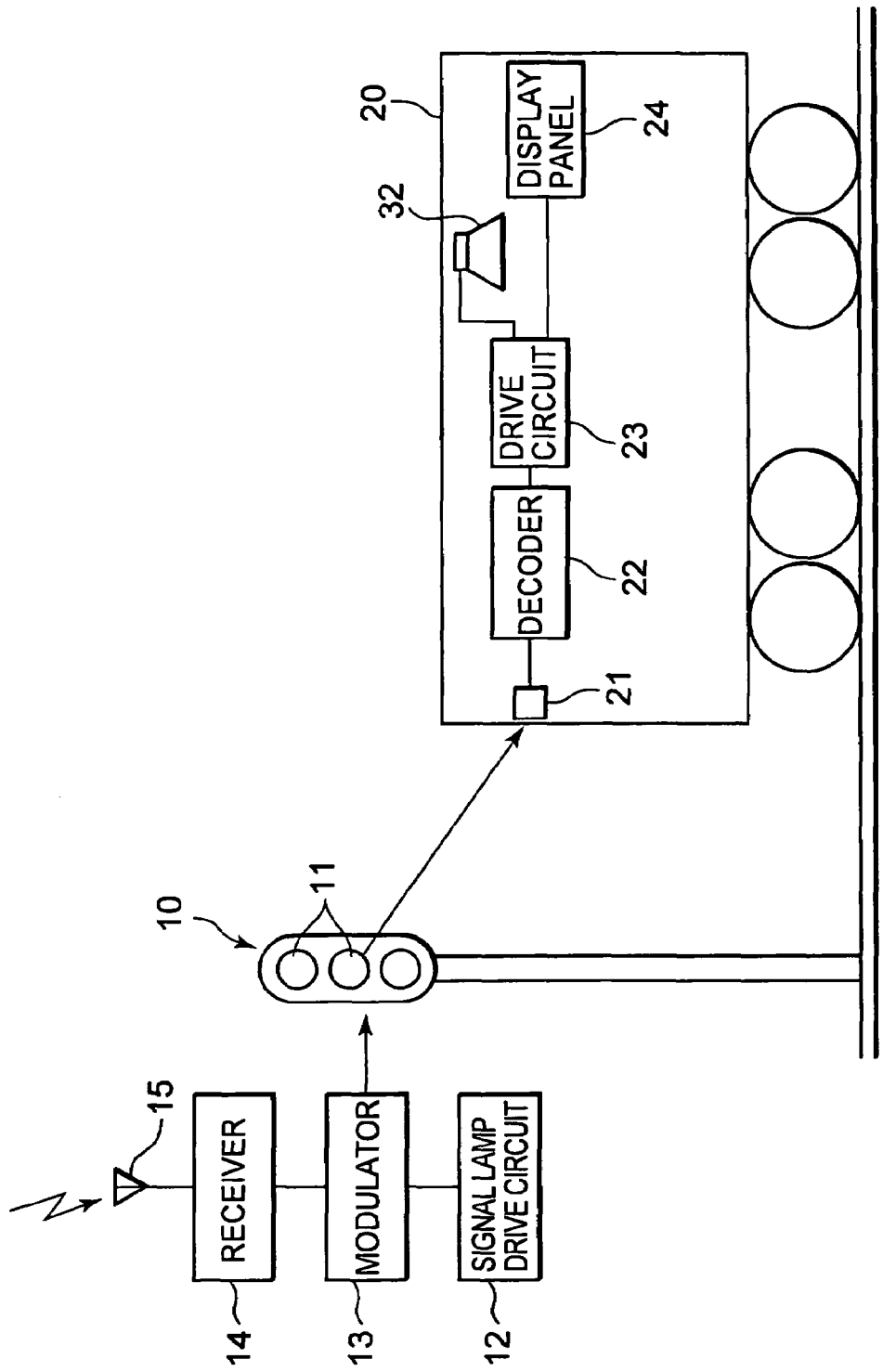
FIG. 9 is a front elevation showing a system according to a still further another modification.

Next, still more another embodiment of the invention will be described by referring to FIG. 9. This embodiment is the one applied to communication between a traffic signal 10 along a railroad track and a train car 20. Namely, a modulator 13 is connected between a signal lamp 11 of the traffic signal 10 installed along the railroad track and a signal drive circuit 12, and in addition, this modulator 13 is connected to a receiver 14. The receiver 14 which is provided with an antenna 15 receives a command signal from a command base station. Conversely, on the side of the train car 20, there are provided a light receiving unit 21, a decoder 22, a drive circuit 23, a display panel 24 and, further, a speaker 32. A light emitting unit of the signal lamp 11 is comprised of, for example, LEDs.

Thereby, when the train car 20 traveling on the track approaches the traffic signal 10, the light receiving unit 21 thereon receives a light from the signal lamp 11 of the traffic signal 10, the decoder 22 thereon reads out a signal superimposed on this light, and the drive circuit 23 drives the display panel 24 or the speaker 32 to perform display operation or voice output operation. By way of example, as the contents of display to be displayed here, it may be an instruction concerning the operation schedule of the train car 20. Besides, any other related information such as an accident or the like may be conveyed simultaneously.

(2) Embodiment 2

Inter-vehicle Communication Equipment: FIGS. 10 to 16

Figure 10:
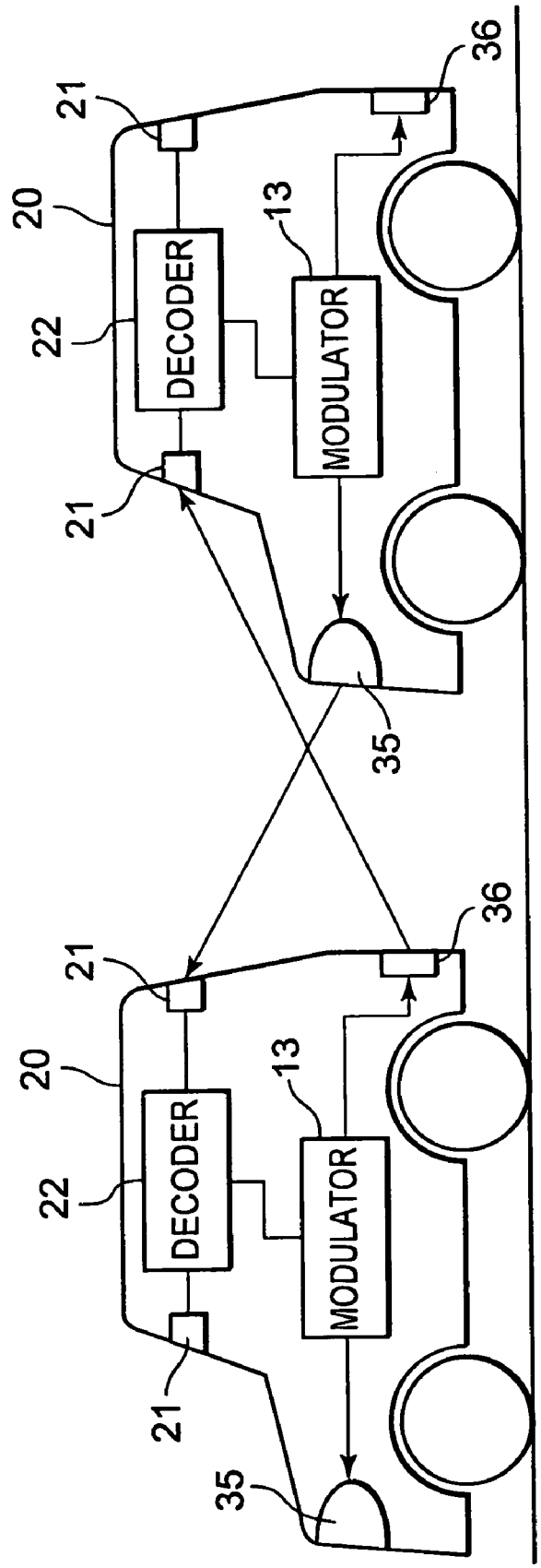
FIG. 10 is a front elevation showing an inter-vehicle communication system according to a second embodiment of the invention.

This preferred embodiment of the invention is directed to an inter-vehicle communication system for carrying out information transfer between vehicles using light. That is, as shown in FIG. 10, a head lamp 35 and/or a tail lamp 36 already provided on a car are utilized. And a modulator 13 is connected to these lamps 35, 36 for superimposing a signal thereon. Further, a light receiving unit 21 for receiving a light is mounted respectively at a front end and a rear end of a vehicle 20. And these light receiving units 21 are connected to a decoder 22. Further, these lamps 35, 36 preferably use LEDs, xenon lamp or the like as its light source to ensure a good responsiveness to the modulation by the modulator 13.

Figure 11:
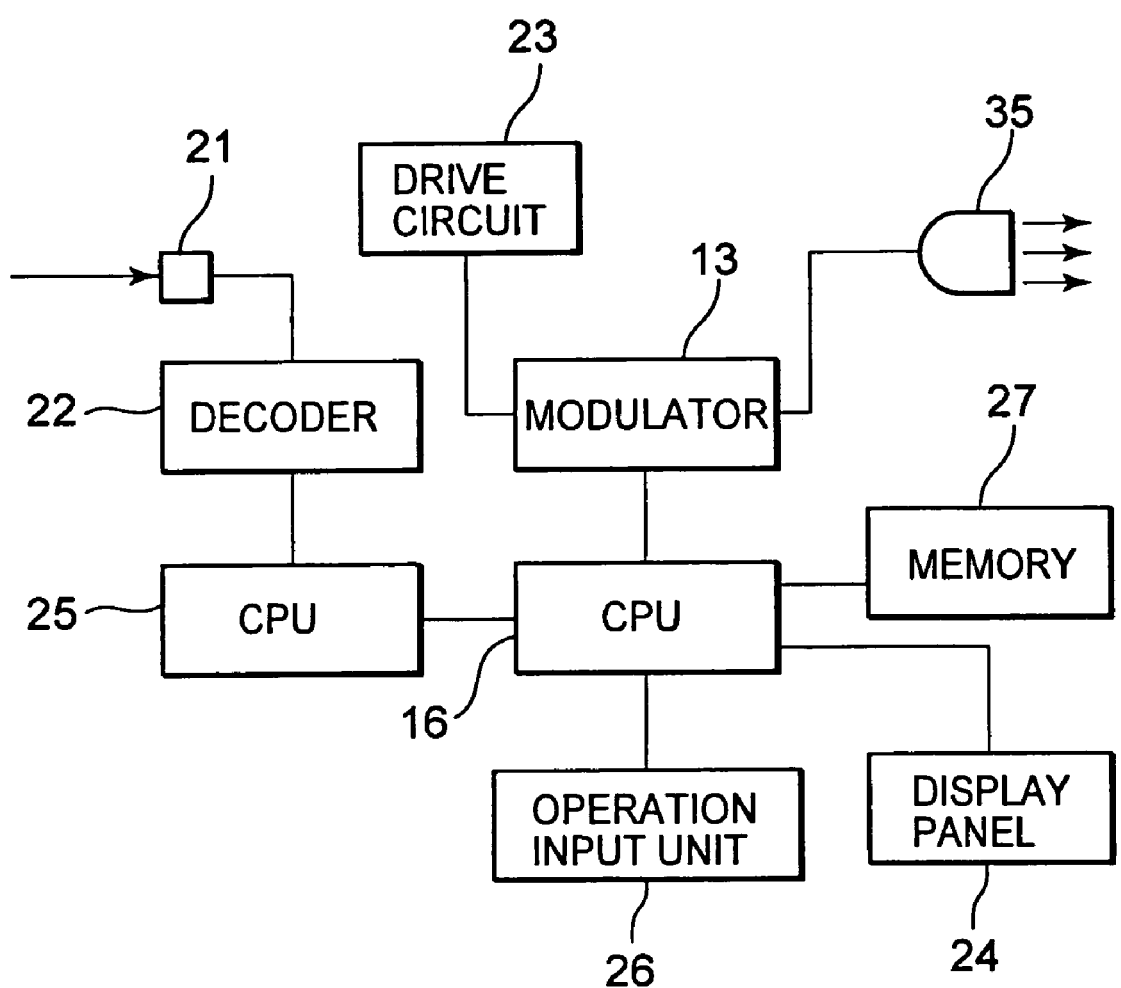
FIG. 11 is a block diagram showing a system configuration of the communication equipment mounted in a vehicle.

FIG. 11 shows a system configuration of such vehicle communication equipment described above, in which the decoder 22 is connected to the light receiving unit 21, and this decoder 22 is also connected to a CPU 25. And the CPU 25 is connected to a CPU 16 on the side of the modulator. The modulator 13 is connected between a drive circuit 23 and the head lamp 35. And the aforementioned CPU 16 is further connected to an operation input unit 26, a display panel 24 and a memory 27.

As described hereinabove, the system for use in the inter-vehicle communication is arranged to receive an external signal via the light receiving unit 21. Here, the light receiving unit 21 is comprised of a photo transistor capable of receiving a light in a visible light range. And the contents of the signal decoded by the decoder 22 are sent to the CPU 16 via the CPU 25, then after processing of the data or program, they are stored in the memory 27. Also, it may be arranged for the memory 27 to have a database, through which a sender's information to be searched, and detailed information such as the names of the sender or corporations and the like are displayed on the display panel 24. It is also possible for the contents of transmission to be stored as voice data and reproduced audibly.

Figure 12:
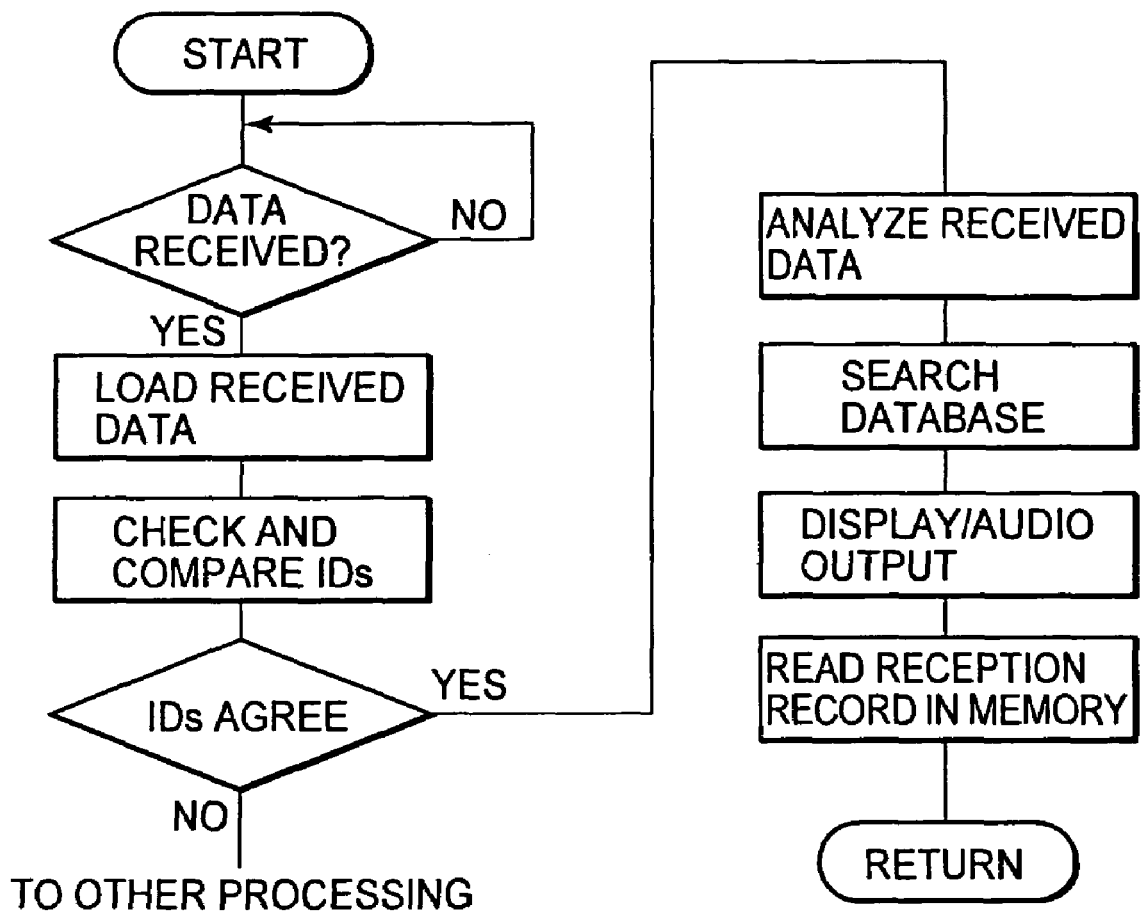
FIG. 12 is a flowchart showing an operation at the time of signal reception.

FIG. 12 shows a receive operation of the system shown in FIG. 11. The CPU 25 detects whether or not the decoder 22 has received a data. If the data is received, the data thereof is loaded in a D-RAM in the CPU 25 to execute comparison of ID check results. The reason why the comparison of the ID check is carried out is because that in a case where unnecessary communication data is received, by going through ID check, only such data to be truly displayed are ensured to be extracted. And in a case where IDs agree, the received data is analyzed, the database on the memory 27 is searched through, then a display or a voice output is given. Further, a received record may be written as required in the memory 27.

As described hereinabove, in the communication system according to this embodiment of the invention, the receiving side verifies permission on the basis of ID data contained in the received data. In a case where the permission is verified, the data is allowed to be analyzed, and in a case where the data is in a voice code, a voice data consistent with the voice code is retrieved from the database such as CD-ROM or the like to be annunciated in a voice message. In a case where voice data itself is received, it is also possible to announce the voice data. In a case of display data, and if it is character data, it is displayed as they are. In this case of the character display, it may be "Thank you", "You may go ahead", "Turn right", "I'm stopping" or the like. In this instance, it is also possible simultaneously to display the sender's data searched from an existing database on one's own vehicle.

Figure 13:
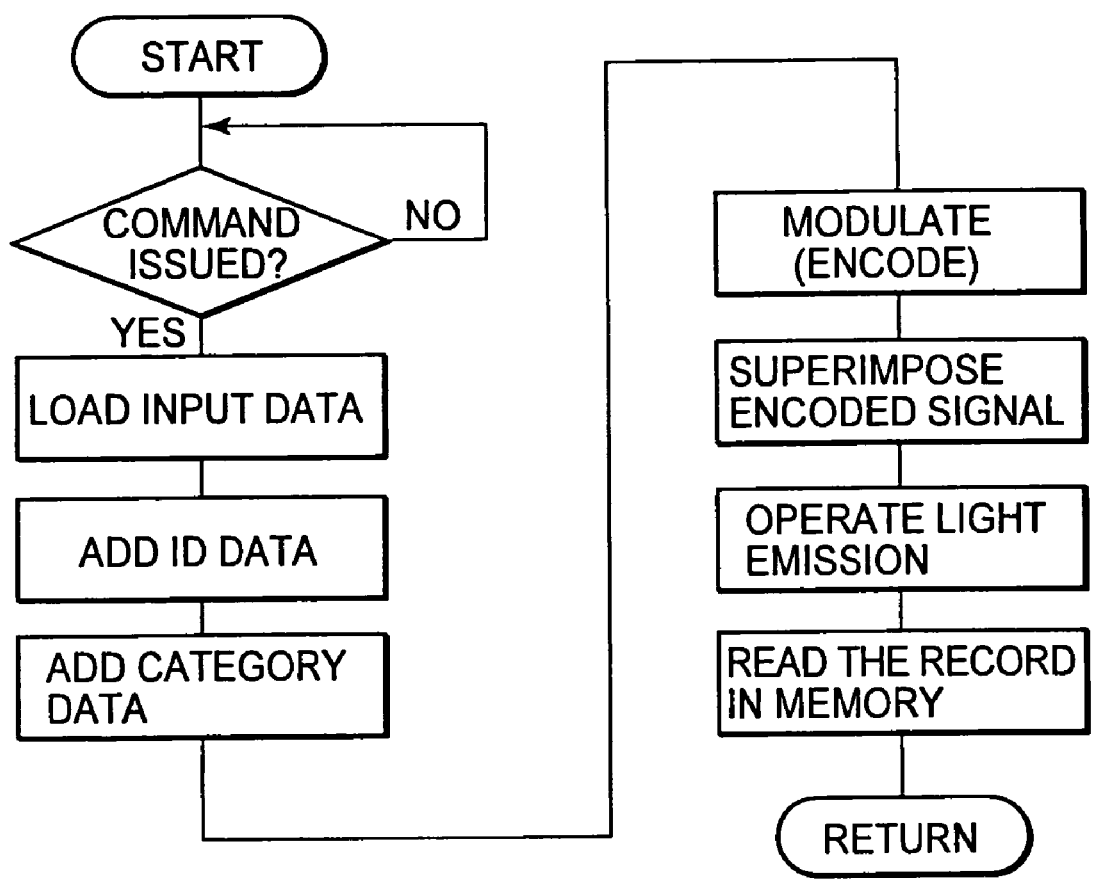
FIG. 13 is a flowchart showing an operation at the time of signal transmission.

FIG. 13 shows an operation of information transmission utilizing the head lamp 35 and/or the tail lamp 36 on the side of the vehicle 20. Here, the CPU 16 determines whether or not a command was transmitted. The determination whether or not the command was transmitted is judged on the basis of the operation by the driver if the driver carried out input operation through an operation input unit 26 or not. And in a case there was a command input, the input data is loaded in the D-RAM of the CPU 16, and in addition, the CPU 16 adds ID data and category data thereto. Subsequently, the data to be transmitted is sent to the modulator 13. The modulator 13 carries out modulation by superimposing this signal on a drive current from the drive circuit 23. Thereby, on the basis of the drive current on which the signal is superimposed, the head lamp 35 is caused to carry out its light emitting operation. By the way, at this instant, the transmission record thereof may be stored in the memory 27 connected to the CPU 16.

Figure 14:
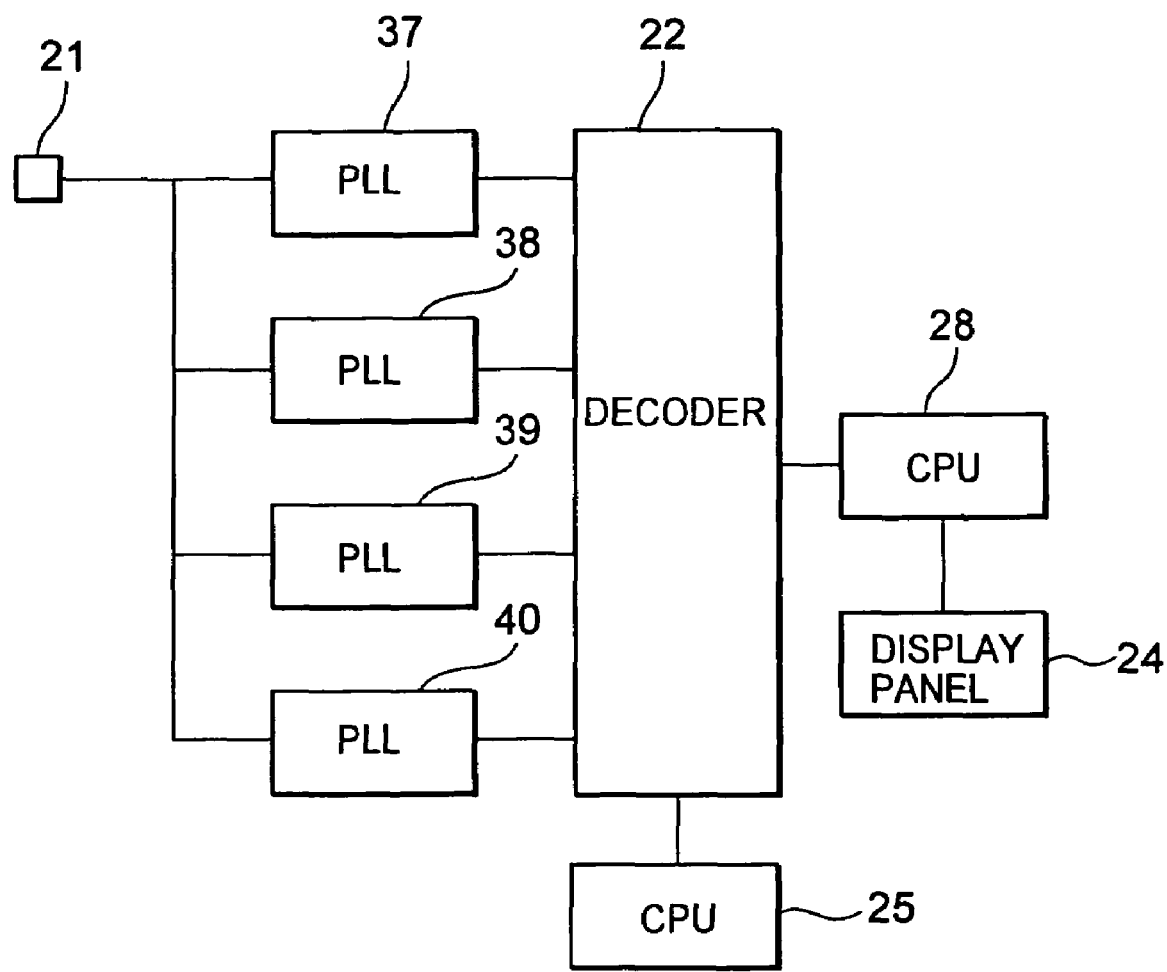
FIG. 14 is a block diagram showing a receiving unit provided with a detection function.

In communication between the vehicles 20, in a case where a plurality of vehicles send signals simultaneously, it becomes necessary to discriminate each to each therebetween. Therefore, as shown in FIG. 14, in order to prevent any erroneous operation in this case, it may be arranged such that a plurality of PLLs 37, 38, 39, 40 which are arranged in parallel and locked at a different frequency from each other are connected in a preceding stage of the decoder 22 and in a subsequent stage of the light receiving unit 21. The PLL is composed of a phase comparator, a low pass filter (LPF) and a voltage controlled oscillator (VCO). In order to carry out a synchronous detection, a plurality of signals therebetween are discriminated by use of these PLLs, and only a predetermined signal is enabled to be extracted and to be supplied to the decoder 22. Thereby, the erroneous operation on the side of the receiver can be prevented even when it receives a plurality of signals from a plurality of vehicles 20 simultaneously.

Figure 15:
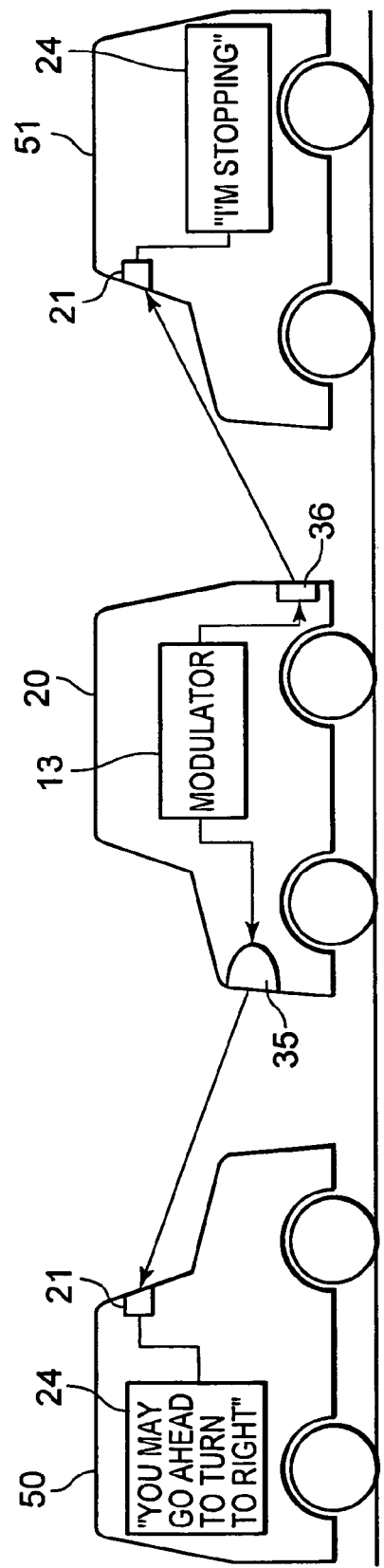
FIG. 15 is a front elevation showing communication equipment according to a modification thereof.

FIG. 15 shows a modification of the above. Here is shown an example in which a single operation enables for plural different signals different from each other to be outputted to a plurality of other vehicles. For example, there may occur such an instance when your car (a vehicle 20 in FIG. 15) approaches an intersection, you find an opposite vehicle (a vehicle 50 in FIG. 15) waiting to turn to the right, so you halt your car vehicle 20, to let the opposite car vehicle 50, go ahead to turn to the right. In such a case, if a following vehicle (a vehicle 51 in FIG. 15) is informed in advance of your intention to halt, a rear-end collision or a sudden braking by the following vehicle 51 can be avoided.

Therefore, in a case you want to show your intention to permit the opposite vehicle 50 to go ahead to turn to the right, your car, the vehicle 20 shown in the middle of the drawing, in response to your single key operation, transmits a signal permitting the opposite vehicle 50 to turn to the right by sending a message "you may go ahead to turn to the right" which is superimposed on the light of the head lamp 35 via a modulator 13. And at the same time, to the following vehicle 51, a signal of message "I'm stopping" indicating your intention to halt is sent as superimposed on the tail lamp 36 via the modulator 13.

Figure 16:
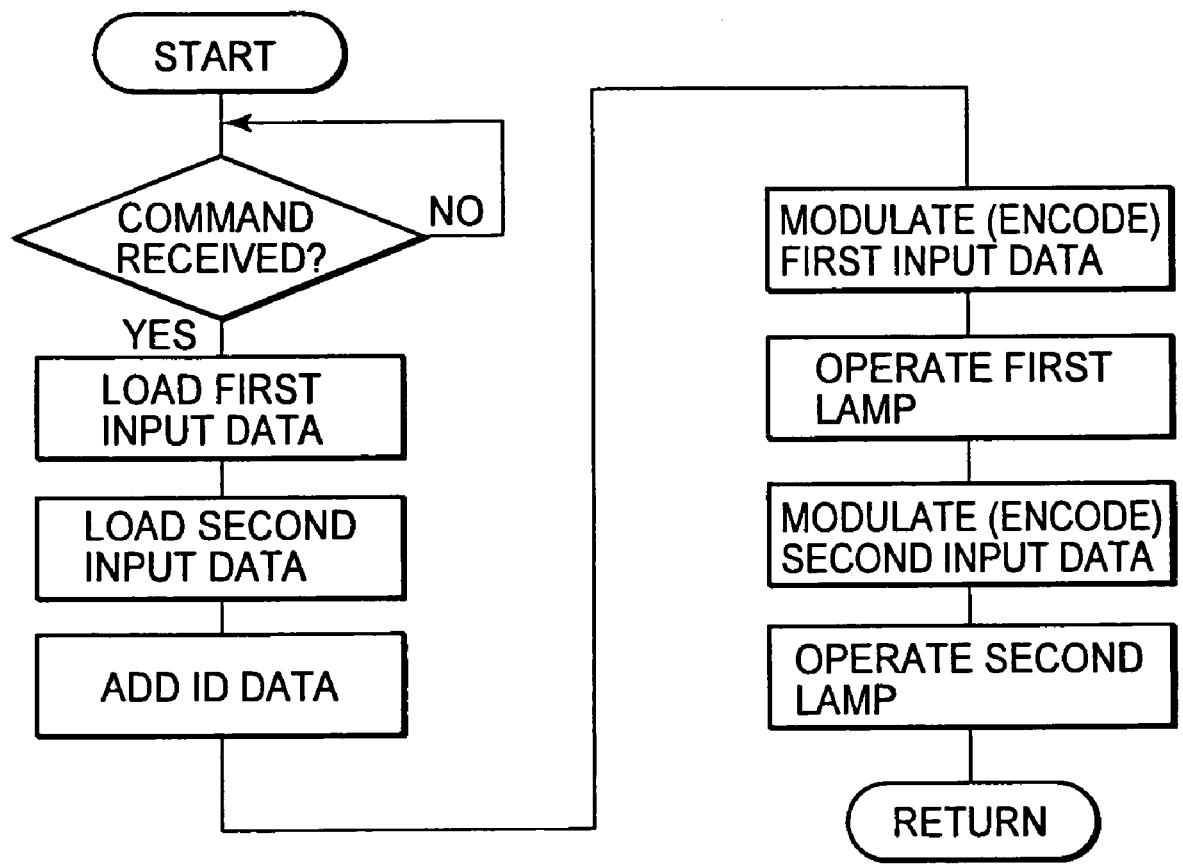
FIG. 16 is a flowchart showing an operation of the equipment according to the modification.

FIG. 16 shows such an operation. For example, in a case where the CPU 16 shown in FIG. 11 receives a command to be transmitted in response to a single key operation, it loads first input data for the vehicle in the forward direction, subsequently loads second data to be transmitted to the vehicle in the backward direction. Then, the CPU 16 attaches ID data to these data, and the first input data is modulated by the modulator 13 to be superimposed on a drive current of the head lamp 35. Thereby, the head lamp 35 emits a modulated light. Then, the CPU 16 supplies the second input data to the modulator 13 so that a signal of the second data is superimposed on a drive current for driving the tail lamp 36. Therefore the tail lamp 36 generates a modulated light superimposed with information to be conveyed to the vehicle in the backward direction. Thereby, it is enabled to supply almost simultaneously a mutually different data to the vehicle 50 in the forward direction and to the vehicle 51 in the backward direction.

Although the invention has been described in its preferred form with a certain degree of particularity, obviously many changes, variations and combinations are possible herein. It is therefore to be understood that any modifications will be practiced otherwise than are specifically described herein without departing from the scope of the present invention. For example, the present invention can be utilized for communication between any stationary type light emitting apparatus other than those specified in the above and a vehicle. Alternatively, the invention may be applied for carrying out information transfer between vehicles using any other light emitting apparatus other than those particularly specified in the above. Further, in place of the display panel for displaying information, it may be arranged to annunciate the information in voice using a speaker as well.

Further, according to the present invention, because it is arranged to superimpose a modulated light to emission from the light emitting apparatus such as the signal lamp, the warning lamp, the head lamp of the vehicle or the like, and to receive the modulated light, influence by an external light is anticipated. Therefore, it is effective to use a polarizing filter, a band pass filter or the like which is capable of extracting the wavelength of an output light from the light emitting apparatus. Alternatively, such a modification may be considered as well that uses a shade to shadow a solar light or in which its light receiving unit is installed in a recess of the vehicle body.

According to one aspect of the present invention, it is comprised of: a light emitting apparatus installed stationarily; a modulator for superimposing a predetermined signal on the light emitted from the light emitting equipment; a light receiving apparatus installed on the side of a vehicle for receiving the light which was emitted from the light emitting apparatus and superimposed with the signal; a decoder for reading out the signal superimposed on the light received by the light receiving apparatus; and output means for outputting the signal read out by the decoder.

Therefore, according to such vehicle communication equipment, it becomes possible to transfer information by establishing communication between the light emitting equipment and the vehicle, by utilizing the stationarily installed light emitting apparatus as it is without impairing its function.

Further, the present invention is comprised of: a light emitting apparatus installed on a vehicle for emitting light outwardly; a modulator for superimposing a predetermined signal on the light emitted from the light emitting apparatus; a light receiving apparatus mounted on the vehicle for receiving the light which is emitted from a light emitting apparatus of another vehicle and is superimposed with the signal; a decoder for reading out the signal superimposed on the light received by the light receiving apparatus; and output means for outputting the signal read out by the decoder.

Therefore, according to such a vehicle, it becomes possible to carry out communication between different vehicles by utilizing existing light emitting apparatus of respective vehicles for emitting the light outwardly as they are without impairing their functions. Therefore, it becomes possible to provide a vehicle equipped with a communication system that is not only capable of simplifying the construction and is also advantageous in cost, without the need of installing any additional light emitting apparatus.

Further, the present invention is comprised of: a light emitting apparatus which is installed stationarily; and a modulator for superimposing a predetermined signal on a light to be emitted from the light emitting apparatus, wherein communication is enabled by emitting a light modulated by the modulator to an external vehicle.

Therefore, according to such vehicle communication equipment, it becomes possible to transfer information by transmitting the signal from the stationary equipment to the vehicle utilizing the light emitting apparatus installed stationarily.

Further, the present invention is comprised of: a light receiving apparatus for receiving a light which is superimposed with a predetermined signal; a decoder for reading out the signal superimposed on the light received by the light receiving apparatus; and notifying means for notifying information based on the signal read out by the decoder.

Therefore, according to such vehicle communication equipment, it becomes possible to transfer information based on the signal to the vehicle by the steps of reading out the signal superimposed on the light received by the light receiving apparatus by the decoder, and by notifying the decoded signal by the notifying means.

The invention claimed is:
1. A vehicle communication system, comprising:
a light emitting apparatus installed stationarily and configured to emit a visible light to communicate with an operator of a vehicle;

a modulator configured to modulate the light emitted from said light emitting apparatus by superimposing a predetermined signal thereon;

a light receiving apparatus installed on a vehicle side and configured to receive a plurality of lights emitted from light emitting apparatuses of other vehicles and superimposed with signals;

a plurality of phase-locked loops arranged in parallel and each locked at a different frequency such that the plurality of phase-locked loops discriminate between a plurality of the signals which are simultaneously received from the other vehicles;

a decoder configured to read out the signals superimposed on the lights received by said light receiving apparatus;

a comparison unit configured to compare an identification of the signals with a predetermined identification such that only data with permission is extracted; and notifying means for notifying information based on a signal which is read out by said decoder.

2. The vehicle communication system as claimed in claim 1, wherein said light emitting apparatus is a signal lamp of a traffic signal.

3. The vehicle communication system as claimed in claim 1, wherein said light emitting apparatus is a street lighting lamp.

4. The vehicle communication system as claimed in claim 1, wherein said light emitting apparatus is a warning lamp at a railroad crossing.

5. The vehicle communication system as claimed in claim 1, wherein said light emitting apparatus is an embed type signal lamp embedded in a vehicle lane.

6. The vehicle communication system as claimed in claim 1, wherein said light emitting apparatus is a signal lamp of a traffic signal installed along a railroad track.

7. The vehicle communication system as claimed in claim 1, wherein said decoder is configured to demodulate a drive current of said light emitting apparatus by superimposing a coded pulse thereon.

8. A vehicle, comprising:
   a light emitting apparatus configured to emit a visible light outwardly to assist an operator of the vehicle;
   a modulator configured to superimpose a predetermined signal on the light emitted from said light emitting apparatus;
   a light receiving apparatus configured to receive a plurality of lights emitted from light emitting apparatuses of other vehicles and superimposed with signals;
   a plurality of phase-locked loops arranged in parallel and each locked at a different frequency such that the plurality of phase-locked loops discriminate between a plurality of the signals which are simultaneously received from the other vehicles;
   a decoder configured to read the signals superimposed on the lights received by said light receiving apparatus;
   a comparison unit configured to compare an identification of the signals with a predetermined identification such that only data with permission is extracted; and
   output means for outputting a signal read out by said decoder.

9. The vehicle as claimed in claim 8, wherein said light emitting apparatus is a head lamp.

10. The vehicle as claimed in claim 8, wherein said light emitting apparatus is a tail lamp.

11. The vehicle as claimed in claim 8, wherein said light emitting apparatus is a brake lamp.

12. The vehicle as claimed in claim 8, wherein said light emitting apparatus is a turn indicator lamp.

13. The vehicle as claimed in claim 8, wherein said light emitting apparatus is installed on the vehicle to cast illumination lights or warning lights to external directions.

14. The vehicle as claimed in claim 8, further comprising:
   discrimination means for discriminating a type of a signal received by said decoder and carrying out a signal processing in dependence on the type thereof.

15. The vehicle as claimed in claim 14, wherein said discrimination means discriminates the type of signal depending on a category signal attached to the signal.

16. The vehicle as claimed in claim 8, further comprising:
   key operation means, wherein, in response to a single operation of the key operation means, a different signal is superimposed on a respective light shed from a plurality of light emitting apparatuses installed in said vehicle and the light is emitted from each of the light emitting apparatuses.

17. The vehicle as claimed in claim 8, further comprising:
   an input unit configured to allow an operator of the vehicle to input a command to be superimposed by the modulator on the light emitted from the light emitting apparatus.

* * * * *